United States Patent [19]

Beinhaur

[11] 4,451,696

[45] May 29, 1984

[54] TOOLLESS SPLICE SEALANT DEVICE

[75] Inventor: Ernest L. Beinhaur, Harrisburg, Pa.

[73] Assignee: AMP Incorporated, Harrisburg, Pa.

[21] Appl. No.: 441,340

[22] Filed: Nov. 15, 1982

[51] Int. Cl.³ .......................................... H02G 15/08
[52] U.S. Cl. ........................................ 174/92; 174/76;
339/116 R
[58] Field of Search ............................ 174/76, 92, 80;
339/116 R, 116 C

[56] References Cited

U.S. PATENT DOCUMENTS

| | | | |
|---|---|---|---|
| 3,138,657 | 6/1964 | Wengen | 174/92 |
| 3,183,302 | 5/1965 | Wochner et al. | 174/92 |
| 3,214,509 | 10/1965 | Hugo | 174/84 |
| 3,255,302 | 6/1966 | Frank, Jr. | 174/138 |
| 3,278,674 | 10/1966 | Matthysse et al. | 174/92 |
| 3,715,459 | 2/1973 | Hoffman | 174/138 F |
| 3,755,615 | 8/1973 | Paullus et al. | 174/76 |
| 3,879,575 | 4/1975 | Dobbin et al. | 174/92 |
| 3,912,854 | 10/1975 | Thompson et al. | 174/76 |
| 4,176,245 | 11/1979 | Merlack et al. | 174/92 |

Primary Examiner—G. P. Tolin
Assistant Examiner—Morris H. Nimmo
Attorney, Agent, or Firm—Donald M. Boles

[57] ABSTRACT

A toolless splice sealant device is taught. Briefly stated, a splice enclosure suitable for enclosing a splice or connection is utilized. Disposed in the splice enclosure is a sealant material. The splice enclosure has one or more compression buttons such that upon application of the splice enclosure to the splice, compression of the compressable buttons causes the sealant, through hydraulic pressure, to completely fill all voids which may exist, forcing the sealant around and along connector and wire. This thereby environmentally seals the splice and prohibits the contamination of the splice which may affect the electrical integrity thereof.

13 Claims, 9 Drawing Figures

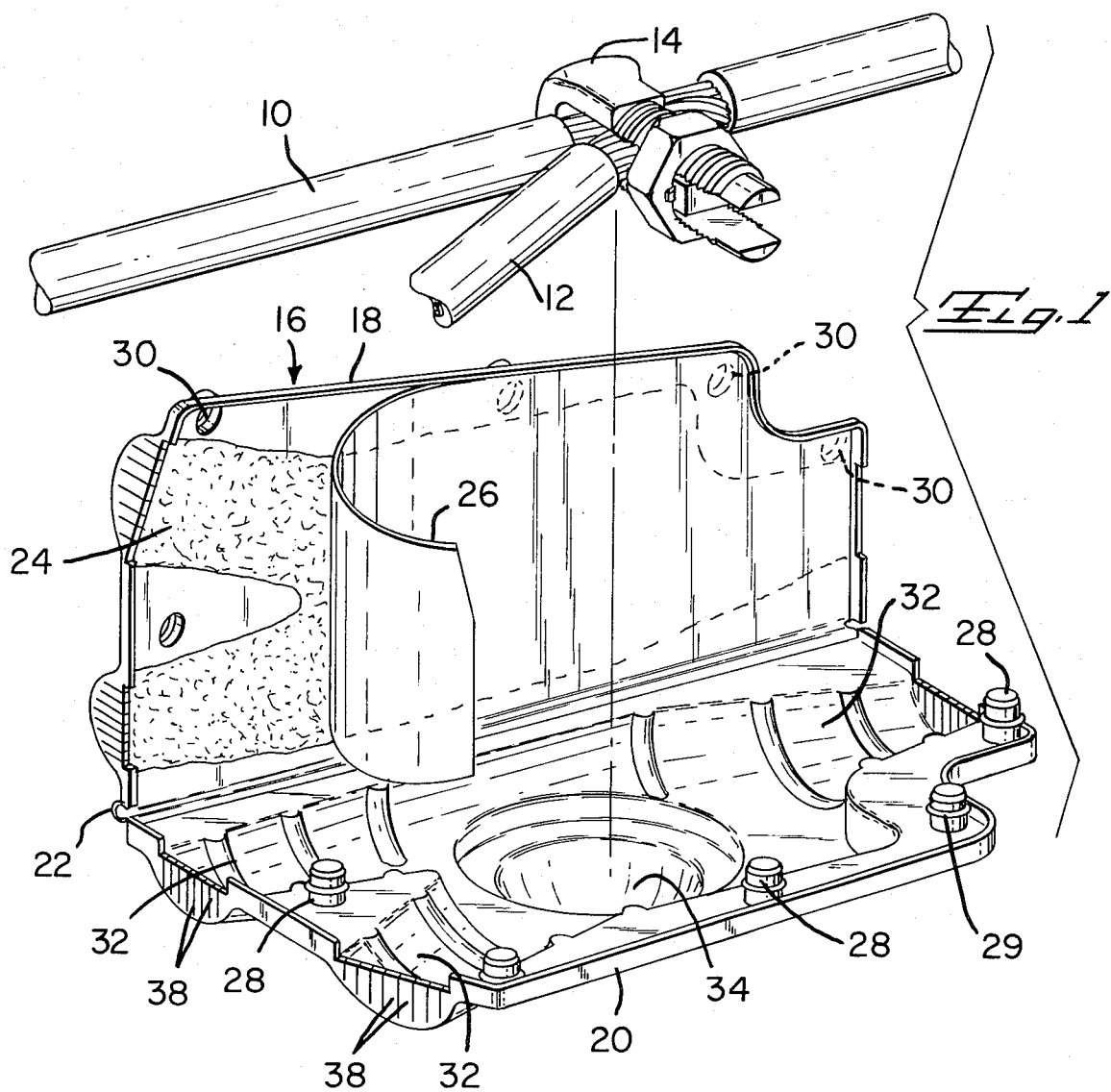
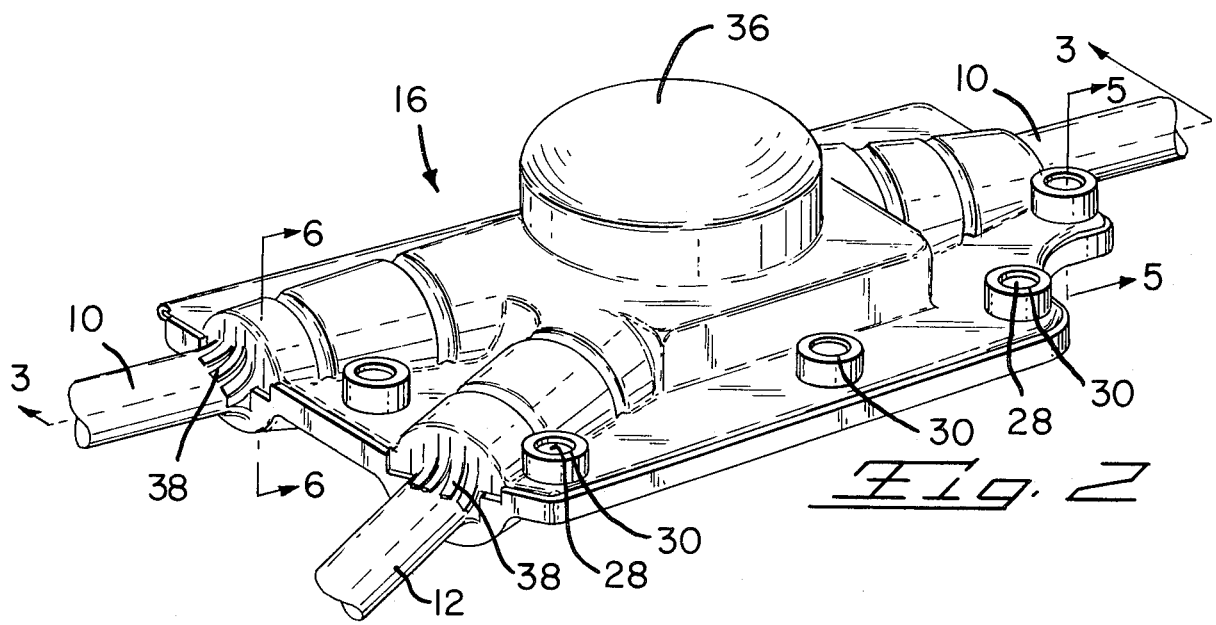

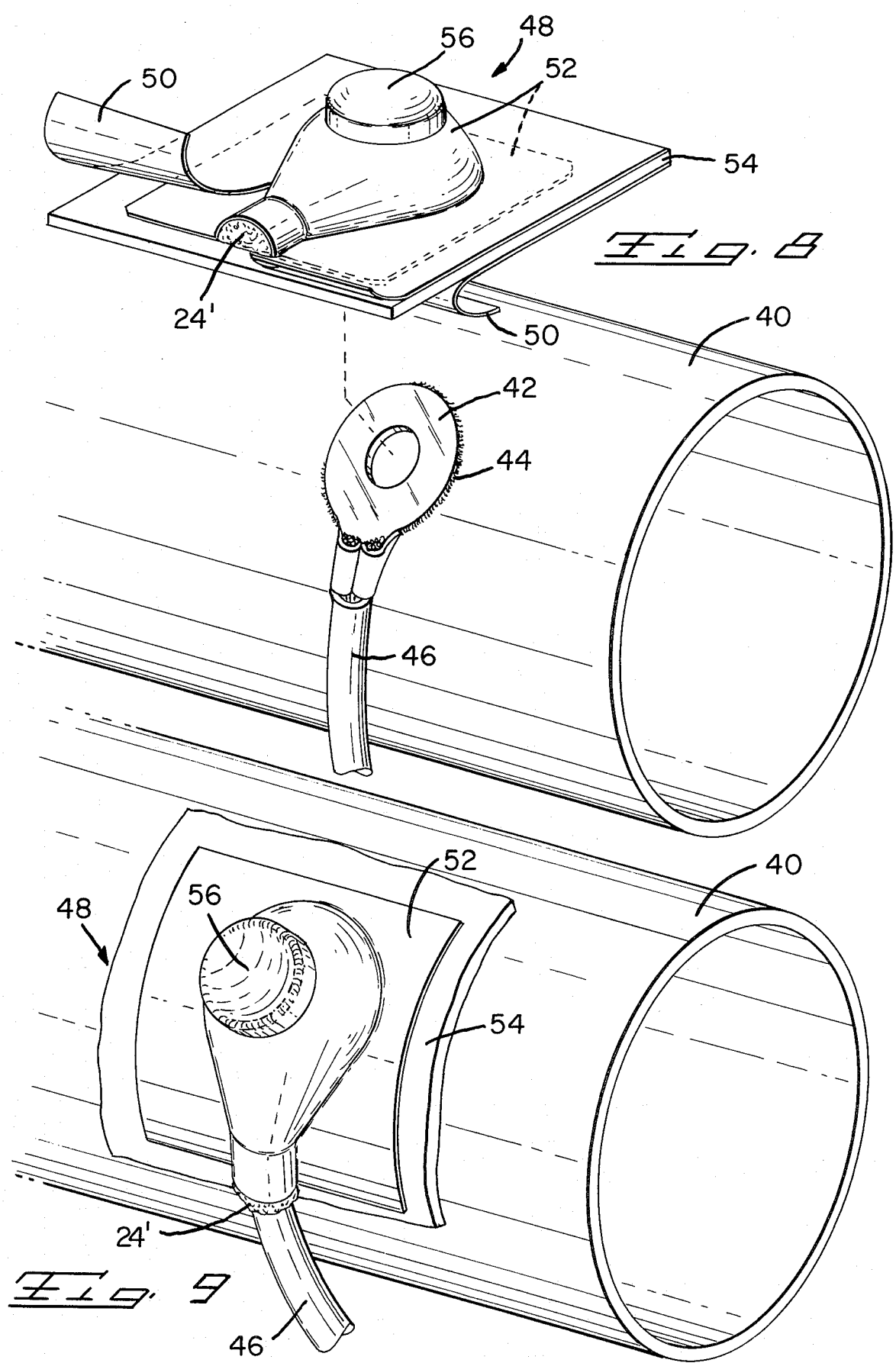

TOOLLESS SPLICE SEALANT DEVICE

This invention relates, generally, to a splice sealant device and more particularly to a device for hydraulic movement of a splice sealant which is particularly suited for underground connections.

Due to increased costs for maintenance and replacement of above ground equipment the burying of communications and electrical cable is becoming more and more prevalent. However in burying such cables, the problem of protecting splices and taps which are necessarily also underground continues to provide a very significant factor in equipment related failures. Many systems combat this problem by encapsulating splices, connectors, with waterproof or resistant enclosures which use waterproof fillers therein. The use of such types of devices are numerous with such type of devices found in U.S. Pat. No. 4,176,245 "Wire Splice Insulators" issued Nov. 27, 1979 to Merlack et al; U.S. Pat. No. 3,879,575 "Encapsulating Compound Enclosure" issued Apr. 22, 1975 to Dobbin et al; U.S. Pat. No. 3,715,459 "Cable Coupling Covering and Moisture Barrier" issued Feb. 6, 1973 to Hoffman; U.S. Pat. No. 3,255,302 "Molded Insulation Casing" issued June 7, 1966 to W. J. Frank, Jr.; U.S. Pat. No. 3,214,509 "Protective Cap for Connections" issued Oct. 26, 1965 to L. A. Hugo; and U.S. Pat. No. 3,138,657 "Splice Insulating System" issued June 23, 1964 to H. R. Wengen.

However, the above mentioned inventions are disadvantageous in their use in that they either require that a filling or potting compound be injected into enclosure. This thereby necessitates separate containers or device for doing such. Where the filling or potting compound is part of a kit, closing of the device is required to encapsulate the splice. However, in this method small voids are inherently created in that the material does not completely surround all portions of the wire or cable particularly in the area of the splice itself or in the area between two wires or cables that are being joined.

It is desirable to have a device which ensures complete encapsulation of all parts of a splice thereby prohibiting the introduction of water and/or foreign contaminants which may effect the integrity of a splice. It is also desirable to have a device which does not require externally applied or external use of devices to fill the splice encapsulating structure with a filling or potting compound. Such a scheme is taught in the present invention.

Accordingly, the present invention relates to a splice sealing device having first and second half members, each substantially a mirror image of the other, the first and second halves defining in cooperation cable channels for receiving cables, the channels extending from the ends of the first and second halves to a cavity contained therein, a centrally positioned compression button disposed on the first and/or the second half, defining the cavity for receiving one or more cables and a cable splice coupling, the compression button being compressably compressable for hydraulically urging a flowable sealant to flow through the channels and the cavity, thereby substantially filling all voids around the splice and the cables so as to form an insulating seal, and a flowable sealant contained in the channels and the cavity.

BRIEF DESCRIPTION OF THE DRAWINGS

Reference is now made to the description of the preferred embodiment illustrated in the accompanying drawings, in which:

FIG. 1 is a partly exploded perspective view of the splice encapsulation kit of the present invention;

FIG. 2 is a perspective view of the splice encapsulation kit of the present invention closed over an actual splice;

FIG. 8 is a partially exploded perspective view of a protective cap which is an alternate embodiment of the present invention; and FIG. 9 is an assembled view similar to that of FIG. 8 illustrating implementation of the alternate embodiment of the present invention.

DESCRIPTION OF THE PREFERRED EMBODIMENTS

Figure 3:
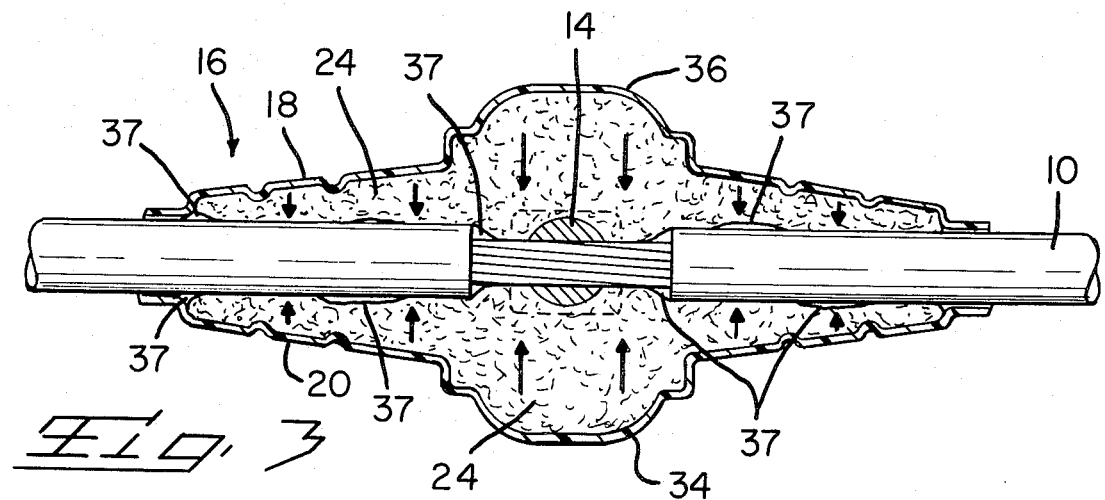
FIG. 3 is a top cross sectional view taken along lines 3—3 of FIG. 2 illustrating voids in the filling material upon mere closing of the splice encapsulation kit.

Referring now to FIG. 1 there is shown a partially exploded perspective view of the present invention. Shown is a feed-through cable 10 which is to be spliced or tapped with the secondary cable 12 and which are held together by a split bolt 14, which ensures solid electrical communication therebetween. Shown also is the splice enclosure shown generally at 16 and which is comprised of a first or top half 18 and a second or bottom half 20 (the top and bottom designations are used for illustration purposes only and do not necessarily indicate any particular direction or orientation of the enclosures 16). The top and bottom halves 18, 20 are joined by a hinge 22 which in the preferred embodiment of the present invention is an integral part of the splice enclosure 16. The splice enclosure 16 in the preferred embodiment of the present invention is comprised of a polyurethane material and is injection molded although it is to be understood that many other types of molding and materials may be suitable. Shown disposed in the top half 18 is sealant 24 which has a protective wax paper 26 placed over it. The purpose of the wax paper 26 is to prevent contamination during shipment and handling as well as providing a reasonably clean area for an infield service person since the sealant 24 is of a somewhat sticky nature. The paper 26 is removed just prior to use of the enclosure 16. Although not shown, the bottom half 20 of the splice enclosure 16 would have a similar arrangement of sealant 24 and wax paper 26. The sealant 24 is a butyl filled compound material which prohibits the ingress of water and contaminants into the splice enclosure 16 and to the splice itself. Contained on the bottom half 20 are closure studs 28 which are arranged so as to mate with a closure stud recess 30 on the top half 18. Contained in the top and bottom halves 18, 20 are splice cavities 32 which accommodate the cables 10 and 12 as well as the splice area around the split bolt 14. A first compression button 34 is shown in the bottom half 20 and is one of two buttons which are used to hydraulically move the sealant (shown more clearly in FIGS. 3 and 4).

Referring now to FIG. 2 there is shown a closed splice enclosure 16. Here it can be seen how the feed-through and the secondary cables 10, 12 enter and exit the splice enclosure 16. Contained as a part of the splice enclosure 16 are cable flaps 38 which help to seal cables entering or exiting the splice enclosure 16. Here it can also be seen that the closure stud 28 and the closure stud recess 30 are fully mated so as to provide a positive locking closure of the splice enclosure 16. Also shown is a second compression button 36.

Referring now to FIG. 3, there is shown a cross-sectional view 3—3 taken from FIG. 2. Here it can be readily seen how upon closure of the splice enclosure 16 voids 37 will appear where sealant 24 has not completely surrounded all portions of the cable 10. It is through these voids 37 that water and other undesirable contaminants may enter the splice enclosure 16.

Figure 4:
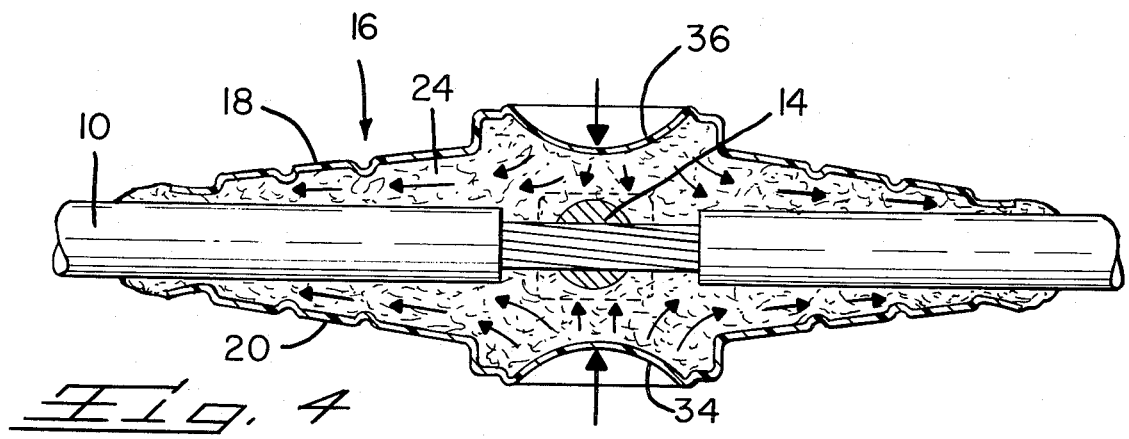
FIG. 4 is a cross sectional view similar to that of FIG. 3 with the buttons of the present invention compressed thereby illustrating the hydraulic movement of the filling material.

Referring now to FIG. 4, there is shown a view similar to that in FIG. 3 with the hydraulic action of the present device illustrated. Shown is that the first and second compression buttons 34, 36 have been compressed thereby forcing the sealant 24 to enter any voids such as those shown in FIG. 3. This therefore provides a water tight complete seal thereby eliminating the ingress of contaminants into the splice enclosure 16. Compression of the first and second compression buttons 34, 36 is readily accomplished by the use of hands only by personnel present in the field and therefore does not require any tools.

Figure 5:
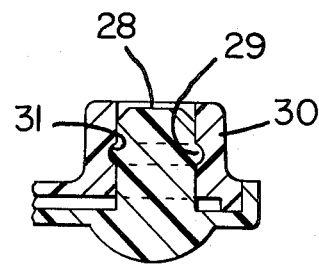
FIG. 5 is a cross sectional view taken through 5—5 of FIG. 2 illustrating the snap type fastening system utilized with the present invention.

Referring now to FIG. 5 there is shown a cross-sectional view 5—5 taken from FIG. 2. Here it can be seen how the closure studs 28, having a closure stud ring 29 contained therein, mate with the closure stud recess 30 and the closure stud ring recess 31 contained therein. This requires relatively little force and does not necessitate the use of hand tools.

Figure 6:
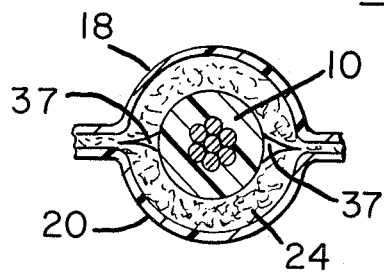
FIG. 6 is a cross sectional view taken through 6—6 of FIG. 2 illustrating where a void may occur upon merely closing of the splice encapsulation kit.
Figure 7:
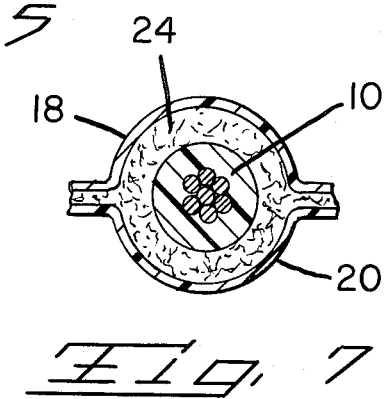
FIG. 7 is a view similar to that of FIG. 6 with the voids removed upon compression of the button seals.

Referring now to FIGS. 6 and 7 there is shown a cross-sectional end view 6—6 taken from FIG. 2 and the creation of a void 37 and its elimination, respectively through hydraulic pressure brought about by compression of the first and second compression buttons 34, 36.

Referring now to FIGS. 8 and 9 an alternate embodiment of the present invention is shown. It is to be remembered that components similar in structural operation to previously described components will be identified by the previously assigned numeral with the addition of a prime ('). Here, the compression button of the present invention is shown for use with a cathodic protection system such as the type found in U.S. Pat. No. 3,214,509 mentioned earlier. Readily visible here is the use of a conduit 40 having attached thereto a spade lug 42 which is shown as being welded 44 to the conduit 40. Attached to the spade lug 42 is a cable 46 which is used in conjunction with a cathodic protection system (now shown). It is to be remembered that different methods of attaching a cable 46 to the conduit 40 may be utilized without departing from the spirit and scope of the present invention. Shown ready to be placed onto the conduit 40 is an enclosure mat 48. The enclosure mat 48 is comprised of a base or mat cover 52 so formed as to have a channel to accommodate the cable 46, although other channels may be used. The mat cover 52 in the preferred embodiment is a polyvinyl chloride. The mat cover 52 is disposed on a mastic 54 which is used for proper adhesion to the conduit 40. Wax paper 50 is disposed on the top and the bottom of the enclosure mat 48 so as to prohibit the introduction of contaminants which may alter the adhesion characteristics of the mastic 54. Contained in the mat cover 52 is a sealant 24'. Upon removal of the wax paper 50 the enclosure mat 48 is placed over the spade lug 42 with the mastic 54 allowed to adhere to the conduit 40. The mastic 54 is a partially filled elastomeric sealant and is commonly known in the trade as AMP 11E-3 and which is produced by AMP Incorporated of Harrisburg, Pa. At this point the mat compression button 56 is compressed thereby forcing the sealant 24' to completely fill all voids which may exist between the enclosure mat 48 and the conduit 40 in a fashion similar to that shown in FIGS. 3 and 4. This, therefore, provides an environmentally sound seal so as to prohibit contaminants from entering under the enclosure mat 48 which may affect the electrical integrity of the cable to spade lug conduit connection 46, 42, 40.

It is to be understood that many variations of the present invention may be utilized without departing from the spirit and scope of the present invention. For example, other types of taps which vary in size and number may be utilized. Additionally, the splice enclosure may include more or less electrical connections. Additionally, other types of cable such as telephone or multi-conductor power may be utilized. Further, other types of mastic or sealant which provides suitable environmental integrity may be utilized. Additionally, the enclosure mat or the splice enclosure itself may be comprised of any material suitable for underground burial and which is compatible with the mastic or sealant may be utilized. Further, additional types or methods for securing together the two halves of the splice enclosure may be utilized.

Therefore, in addition to the above enumerated advantages the disclosed invention produces a splice sealant device which is suitable for underground usage and which is relatively inexpensive as well as easy to manufacture requiring no tools to environmentally seal or protect a splice and which thereby provides ease of use in the field.

I claim:

1. A splice sealant device, comprising:
   a cable splice covering;
   at least one cable channel means disposed in said splice covering receiving at least one cable;
   flowable sealant contained in said cable splice covering; and
   at least one compression button means disposed on said splice covering, said compression button means being compressible for hydraulically urging the flowable sealant to flow through said channel, thereby adapted to substantially fill all voids around the cable so as to form an insulating seal therearound.

2. A splice sealant device, comprising:
   first and second half members, each substantially a mirror image of the other, said first and second halves defining in cooperation;
   cable channels receiving cables, said channels extending from the ends of said first and second halves to a cavity receiving one or more cables and a cable splice coupling therein;

flowable sealant contained in said channels and said cavity; and a compression button means disposed on one of said first and/or said second halves, said compression button means being compressible for hydraulically urging the flowable sealant to flow through said channels and said cavity, thereby adapted to substantially fill all voids around the cable splice coupling and the cables so as to form an insulating seal therearound.

3. A device according to claim 2 wherein said sealant is comprised of a butyl filled compound.

4. A device according to claim 2 wherein said cable splice coupling is comprised of a split bolt.

5. A device according to claim 2 wherein said first and second half members are comprised of polyurethane.

6. A device according to claim 2 wherein closure studs are disposed on one of said half members and closure stud recesses disposed on the remaining half member, said studs and recesses so aligned such that upon closure of said first and second half members said closure studs and said stud recesses are cooperatively engaged thereby interlockingly joining said first and said second half members.

7. A device according to claim 2 wherein said first and said second half members are joined at a common edge by a hinge means, said hinge being integrally molded with said first and said second half members.

8. A device according to claim 2 wherein at least three channels are disposed on said splice sealant device.

9. A protective enclosure mat for cable and cable splice couplings, comprising:

a substantially flat mat cover;

a channel receiving a cable and a cable splice coupling, said channel extending from one end of said mat cover to a cavity contained in said mat cover;

flowable seal and contained in said channel and said cavity; and compression button means centrally disposed on said mat cover and defining a cavity therein, said button means being compressible for hydraulically urging the flowable sealant contained in said channel and said cavity to flow through said channel and said cavity thereby adapted to substantially fill all voids around the cable and the cable coupling so as to form an insulating seal therearound.

10. A device according to claim 9 wherein said mat cover is placed on an underground circuit, said conduit having a protective cover disposed thereon and further having a portion removed therefrom so as to accommodate the application of said protective enclosure mat.

11. A device according to claim 9 wherein a plurality of channels receiving the cable and the cable splice coupling are disposed on said enclosure mat.

12. A device according to claim 9 wherein said sealant is comprised of a butyl filled compound.

13. A device according to claim 9 wherein said enclosure mat is comprised of polyurethane.

* * * * *